US008984068B2

(12) United States Patent
Bremner et al.

(10) Patent No.: US 8,984,068 B2
(45) Date of Patent: Mar. 17, 2015

(54) EMAIL-READ STATUS

(75) Inventors: Richard Bremner, Pyrmont (AU);
Matthew James Ponsford, Sydney (AU)

(73) Assignee: International Business Machines Corporation, Armonk, NY (US)

(*) Notice: Subject to any disclaimer, the term of this patent is extended or adjusted under 35 U.S.C. 154(b) by 632 days.

(21) Appl. No.: 12/761,610

(22) Filed: Apr. 16, 2010

(65) Prior Publication Data
US 2011/0258264 A1      Oct. 20, 2011

(51) Int. Cl.
*G06F 15/16* (2006.01)
*G06Q 10/10* (2012.01)

(52) U.S. Cl.
CPC ................................. *G06Q 10/107* (2013.01)
USPC ........................... 709/206; 709/207; 709/227

(58) Field of Classification Search
CPC ..... H04L 12/58; H04L 12/583; H04L 12/585;
H04L 12/5855; H04L 12/587; H04L 51/12;
H04L 51/14; H04L 51/24; H04L 51/26;
H04L 51/28; H04L 51/34; H04L 67/34;
H04L 67/306
USPC .......................................... 709/206–207, 227
See application file for complete search history.

(56) References Cited

U.S. PATENT DOCUMENTS

| | | | | |
|---|---|---|---|---|
| 5,835,084 A | * | 11/1998 | Bailey et al. | 715/783 |
| 7,359,947 B2 | * | 4/2008 | Kelley et al. | 709/206 |
| 8,005,907 B2 | | 8/2011 | Haynes et al. | |
| 8,051,138 B2 | * | 11/2011 | Madnani | 709/206 |
| 2005/0223077 A1 | | 10/2005 | Vellanki et al. | |
| 2008/0114849 A1 | | 5/2008 | Yuyama | |
| 2009/0083658 A1 | | 3/2009 | Ito et al. | |
| 2009/0106370 A1 | * | 4/2009 | Dreyfus et al. | 709/206 |
| 2009/0213435 A1 | | 8/2009 | Cohen | |
| 2010/0262922 A1 | * | 10/2010 | Fan et al. | 715/752 |

FOREIGN PATENT DOCUMENTS

| | | |
|---|---|---|
| EP | 1624654 | 2/2006 |
| EP | 1 947 559 A1 | 7/2008 |
| JP | 4250749 | 9/1992 |
| JP | 2001229088 | 8/2001 |
| JP | 200424066 | 8/2004 |

OTHER PUBLICATIONS

Australian International Search Report and Written Opinion for Australian Patent Application No. PCT/EP2011/055931; mailed Jun. 29, 2011.

* cited by examiner

*Primary Examiner* — David Lazaro
*Assistant Examiner* — Farzana Huq
(74) *Attorney, Agent, or Firm* — Sughrue Mion, PLLC

(57) ABSTRACT

A method and computer program product for marking email-read status in an email application is described. A method may comprise defining, via at least one of a client electronic device and a server computer, a marked-read characteristic corresponding to an email. The method may further comprise determining, via at least one of the client electronic device and the server computer, a marked-read preview time based upon, at least in part, the marked-read characteristic. The method may also comprise designating, via at least one of the client electronic device and the server computer, the email as read based upon, at least in part, the marked-read preview time.

17 Claims, 4 Drawing Sheets

EMAIL-READ STATUS

BACKGROUND OF THE INVENTION

This disclosure relates to email applications and, more particularly, to methodologies for marking email-read status in email applications.

Email applications may allow a user to mark emails as read or unread. They may be configured to automatically mark email as read when email is opened in a new pane or in a preview pane. Some applications may mark the email as read once it has been opened in a new pane or a preview pane for more than a fixed time limit.

It may be possible that the user did not actually read the email before it was automatically marked as read. Accordingly, the email may mistakenly be marked as read. As such, there may be a need to improve ways in which email applications automatically mark emails as read.

BRIEF SUMMARY OF THE INVENTION

In a first embodiment, a method may comprise defining, via at least one of a client electronic device and a server computer, a first incoming communication type and marked-read characteristic corresponding to an email. The method may further comprise determining, via at least one of the client electronic device and the server computer, a marked-read preview time based upon, at least in part, the marked-read characteristic. The method may also comprise designating, via at least one of the client electronic device and the server computer, the email as read based upon, at least in part, the marked-read preview time.

One or more of the following features may be included. Designating the email as read may further be based upon, at least in part, an amount of time the email is open. Designating the email as read may also be based upon, at least in part, an amount of time the email is open in a preview pane. Additionally, the marked-read characteristic may be a length of the email. The length of the email may account for whitespace in the email. The marked-read characteristic may be at least one of a number of characters in the email, a number of words in the email, and a number of lines in the email. The marked-read characteristic may also be a size of the email. Further, the marked-read characteristic may be at least one of a size of an image in the email, and dimensions of the image in the email.

In some implementations, the method may comprise defining a user-action characteristic corresponding to the email. The method may also comprise designating the email as read based upon, at least in part, the user-action characteristic. The user action characteristic may be at least one of scrolling to a bottom of the email, and a mouse action.

In second embodiment, a computer program product may reside on a computer readable storage medium and may have a plurality of instructions stored on it. When executed by a processor, the instructions may cause the processor to perform operations comprising defining a marked-read characteristic corresponding to an email. The operations may further comprise determining a marked-read preview time based upon, at least in part, the marked-read characteristic. The operations may also comprise designating the email as read based upon, at least in part, the marked-read preview time.

One or more of the following features may be included. Designating the email as read may further be based upon, at least in part, an amount of time the email is open. Designating the email as read may also be based upon, at least in part, an amount of time the email is open in a preview pane. Additionally, the marked-read characteristic may be a length of the email. The length of the email may account for whitespace in the email. The marked-read characteristic may be at least one of a number of characters in the email, a number of words in the email, and a number of lines in the email. The marked-read characteristic may also be a size of the email. Further, the marked-read characteristic may be at least one of a size of an image in the email, and dimensions of the image in the email.

In some implementations, the operations may comprise defining a user-action characteristic corresponding to the email. The operations may also comprise designating the email as read based upon, at least in part, the user-action characteristic. The user action characteristic may be at least one of scrolling to a bottom of the email, and a mouse action.

In a third embodiment, a computing system is provided. The computing system may include at least one processor and at least one memory architecture coupled with the at least one processor. The computing system may also include a first software module executed on the at least one processor and the at least one memory architecture, wherein the first software module is configured to define a marked-read characteristic corresponding to an email. Further, the computing system may include a second software module configured to determine a marked-read preview time based upon, at least in part, the marked-read characteristic. Additionally, the computing system may include a third software module configured to designate the email as read based upon, at least in part, the marked-read preview time.

One or more of the following features may be included. Designating the email as read may be further based upon, at least in part, an amount of time the email is open. Designating the email as read may also be based upon, at least in part, an amount of time the email is open in a preview pane. The marked-read characteristic may be a length of the email. The length of the email may account for whitespace in the email.

The details of one or more implementations are set forth in the accompanying drawings and the description below. Other features and advantages will become apparent from the description, the drawings, and the claims.

DETAILED DESCRIPTION OF THE INVENTION

Figure 1:
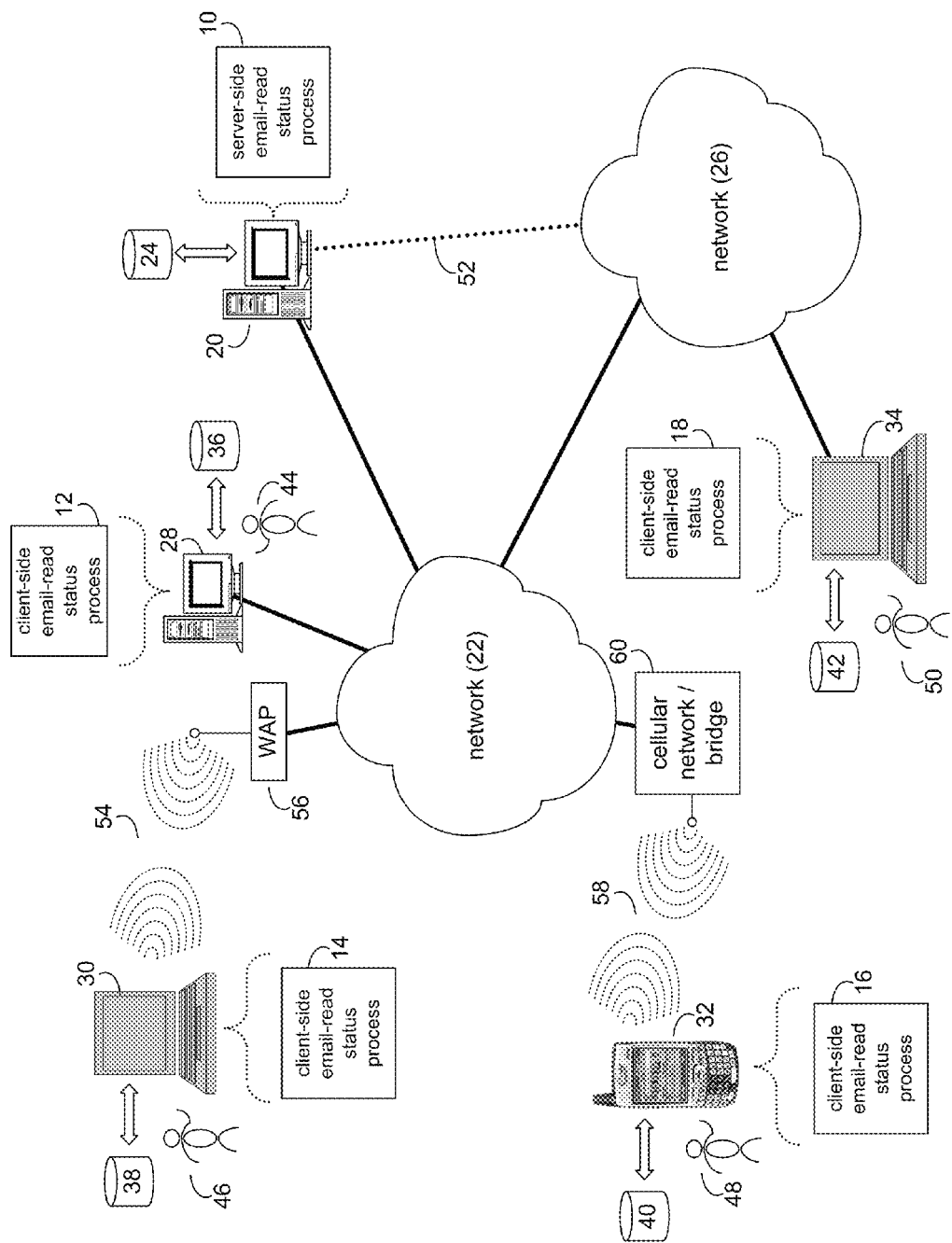
FIG. 1 is a diagrammatic view of an email-read status process coupled to a distributed computing network.
Figure 2:
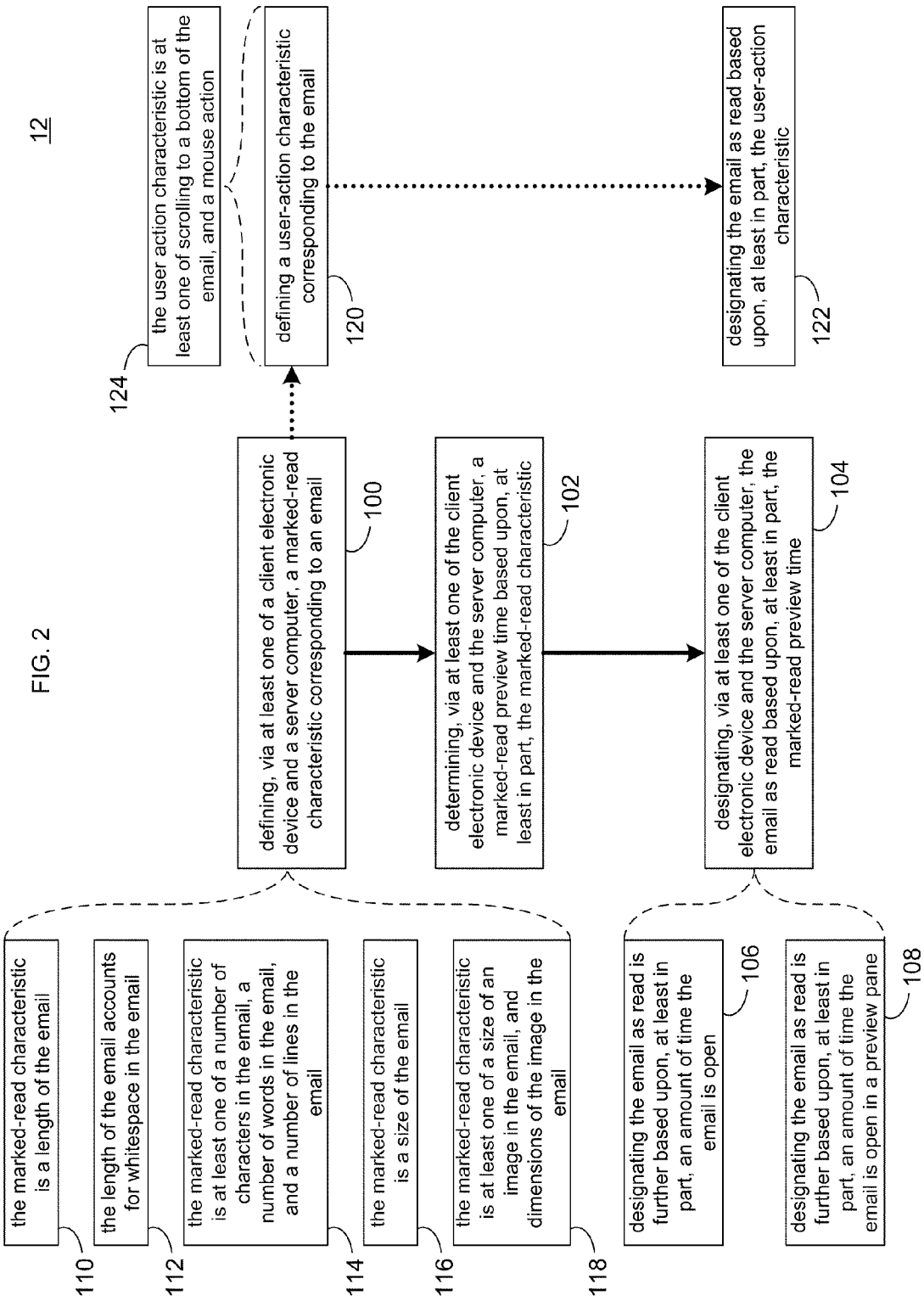
FIG. 2 is a flowchart of the email-read status process of FIG. 1.

Referring to FIGS. 1 & 2, there is shown a email-read status process 12. As will be discussed below, email-read status process 12 may define 100, via at least one of a client electronic device and a server computer, a marked-read characteristic corresponding to an email. A marked-read preview time may be determined 102 based upon, at least in part, the marked-read characteristic. The email may be designated 104 as read based upon, at least in part, the marked-read preview time.

The email-read status (ERS) process may be a server-side process (e.g., server-side ERS process 10), a client-side process (e.g., client-side ERS process 12, client-side ERS process 14, client-side ERS process 16, or client-side ERS process 18), or a hybrid server-side/client-side process (e.g., the combination of server-side ERS process 10 and one or more of client-side ERS processes 12, 14, 16, 18).

Server-side ERS process 10 may reside on and may be executed by server computer 20, which may be connected to network 22 (e.g., the Internet or a local area network). Examples of server computer 20 may include, but are not limited to: a personal computer, a server computer, a series of server computers, a mini computer, and/or a mainframe computer. Server computer 20 may be a web server (or a series of servers) running a network operating system, examples of which may include but are not limited to: Microsoft® Windows Server®; Novell® Netware®; or Red Hat® Linux®, for example.

The instruction sets and subroutines of server-side ERS process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application, examples of which may include but are not limited to: Microsoft® IIS, Novell® Web Server, or Apache® Web Server, that allows for access to server computer 20 (via network 22) using one or more protocols, examples of which may include but are not limited to HTTP (i.e., HyperText Transfer Protocol), SIP (i.e., session initiation protocol), and the Lotus® Sametime® VP protocol. Network 22 may be connected to one or more secondary networks (e.g., network 26), examples of which may include but are not limited to: a local area network; a wide area network; or an intranet, for example.

Client-side ERS processes 12, 14, 16, 18 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 22 and/or network 26 and may each execute an operating system, examples of which may include but are not limited to Microsoft® Windows®, Microsoft Windows CE®, Red Hat® Linux®, or a custom operating system.

The instruction sets and subroutines of client-side ERS processes 12, 14, 16, 18, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side ERS processes 12, 14, 16, 18 and/or server-side ERS process 10 may be processes that run within (i.e., are part of) an email application. Alternatively, client-side ERS processes 12, 14, 16, 18 and/or server-side ERS process 10 may be stand-alone applications that work in conjunction with an email application. One or more of client-side ERS processes 12, 14, 16, 18 and server-side ERS process 10 may interface with each other (via network 22 and/or network 26) to allow a plurality of users (e.g., users 44, 46, 48, 50) to share information.

Users 44, 46, 48, 50 may access server-side ERS process 10 directly through the device on which the client-side ERS process (e.g., client-side ERS processes 12, 14, 16, 18) is executed, namely client electronic devices 28, 30, 32, 34, for example. Users 44, 46, 48, 50 may access server-side ERS process 10 directly through network 22 and/or through secondary network 26. Further, server computer 20 (i.e., the computer that executes server-side ERS process 10) may be connected to network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, Wi-Fi, and/or Bluetooth device that is capable of establishing wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The ERS Process

The ERS process may designate (i.e., mark) an email as read based upon, at least in part, a marked-read preview time. For the following discussion, client-side ERS process 12 will be described for illustrative purposes. Client-side ERS process 12 may be incorporated into server-side ERS process 10 and may be executed within one or more email applications that allow for communication with client-side ERS process 12. However, this is not intended to be a limitation of this disclosure, as other configurations are possible (e.g., stand-alone, client-side ERS processes and/or stand-alone server-side ERS processes.) For example, some implementations may include one or more of client-side ERS processes 14, 16, 18 in place of or in addition to client-side ERS process 12.

Referring now to FIGS. 1-4, client-side ERS process 12 may define 100, via at least one of a client electronic device (e.g., client electronic devices 28, 30, 32, 34) and a server computer (e.g., server computer 20), a marked-read characteristic (e.g., marked-read characteristics 302-318) corresponding to an email (e.g., email 202). Further, ERS process 12 may determine 102 via at least one of a client electronic device (e.g., client electronic devices 28, 30, 32, 34) and a server computer (e.g., server computer 20), a marked-read preview time (e.g., marked-read preview time 204) based upon, at least in part, the marked-read characteristic (e.g., one or more of marked-read characteristics 302-318). Additionally, ERS process 12 may designate 104 via at least one of a client electronic device (e.g., client electronic devices 28, 30, 32, 34) and a server computer (e.g., server computer 20), email 202 as read (i.e., with marked-read symbol 206) based upon, at least in part, marked-read preview time 204.

Figure 3:
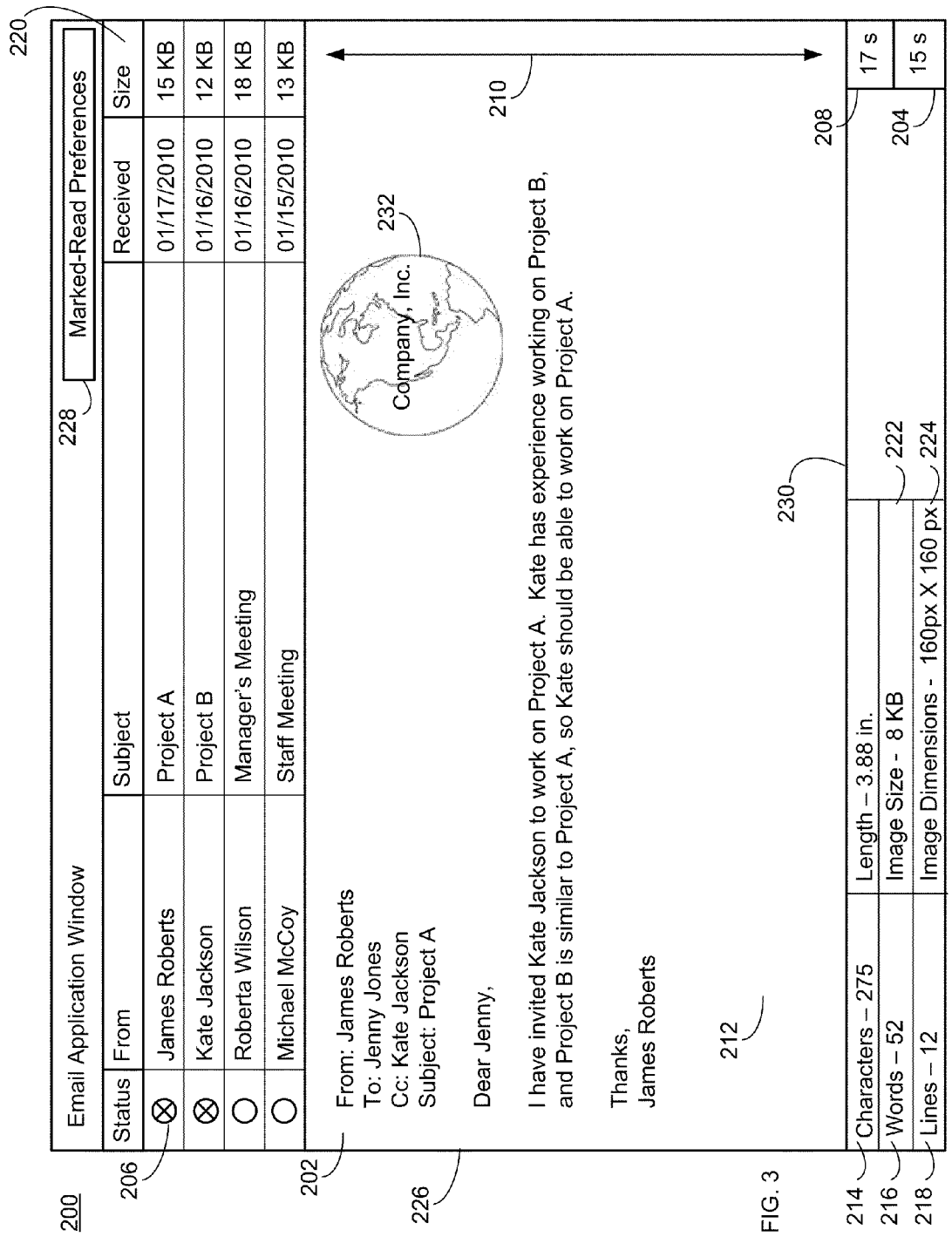
FIG. 3 is an email application which may be associated with the email-read status process.

In one implementation, ERS process 12 may designate 106 email 202 as read further based upon, at least in part, an amount of time (e.g., email-open time 208) email 202 is open. Marked-read preview time 204 and email-open time 208, as shown in FIG. 3, are provided for illustrative purposes and may or may not be shown via email application 200. ERS process 12 may also designate 108 email 202 as read further based upon, at least in part, an amount of time (e.g., email-open time 208) email 202 is open in preview pane 226. Email 202 is shown as open in preview pane 226 for illustrative purposes only, as email 202 may also be open in its own window separate from preview pane 226.

Figure 4:
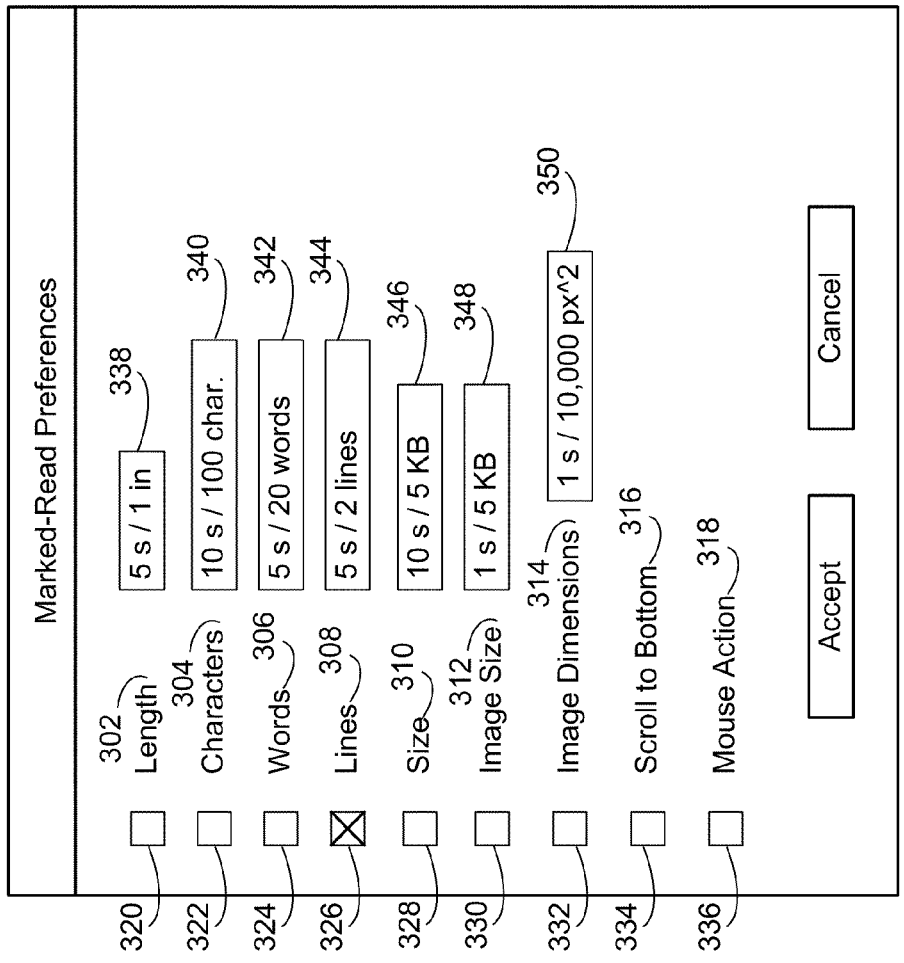
FIG. 4 is a graphical user interface which may be associated with the email-read status process.

Referring now to FIGS. 3 & 4, email application 200 may provide marked-read preferences graphical user interface (GUI) 300. Marked-read preferences GUI 300 may be rendered after a user presses marked-read preferences button 228. A user may select one or more of marked-read characteristics 302-318 by checking one or more of marked-read characteristic checkboxes 320-336, each of which may correspond to one of marked-read characteristics 302-318. For example, if the user wishes to select marked-read preference 308 (i.e., lines), the user may select checkbox 326.

As mentioned above, ERS process 12 may determine 102 marked-read preview time 204 based upon, at least in part, one or more of marked-read characteristics 302-318. The marked-read characteristic may be (110) length 210 of email 202. Length 210 may be measured in any unit of measurement standard for measuring documents, for example, in inches. A user may select marked-read characteristic checkbox 320 in order to select length as a marked-read characteristic (e.g., marked-read characteristic 302). In this way, ERS process 12 may define length as a marked-read characteristic. Further, the user may input time/length rate 338 in order to allow ERS process 12 to determine marked-read preview time 204. Time/length rate 338 may be, for example, 5 seconds per inch, as shown in GUI 300. For example, if email 202 is 3.88 inches long, ERS process 12 may determine marked-read preview time 204 to be (3.88 in)×(5 s)=19 s. As such, ERS process 12 may designate email 202 as read if email 202 is open for more than 19 s. In one implementation, the length may account (112) for whitespace 212 in email 202. For example, if email 202 includes 1.50 inches of whitespace (i.e., space in the email without content), ERS process 12 may determine the length of email 202 to be (3.88 in)–(1.50 inches)=2.38 inches.

The marked-read characteristic may also be (114), at least one of number of characters 214 (i.e., marked-read characteristic 304) in email 202, number of words 216 (i.e., marked-read characteristic 306) in email 202, and number of lines 218 (i.e., marked-read characteristic 308) in email 202. The user may select the marked-read characteristic to be number of characters 214, number of words 216, and/or number of lines 218 by selecting marked-read characteristic checkbox 322, 324, and/or 326, respectively. Further, the user may input time/character rate 340, time/word rate 342, and/or time/line rate 344, respectively, in order to allow ERS process 12 to determine marked-read preview time 204. For example, and as shown in FIG. 4, if the user selects marked-read characteristic checkbox 326, the marked-read characteristic may be number of lines 218. Further, if the user inputs time/line rate 344 to be 5 seconds per 2 lines, ERS process 12 may determine marked-read preview time 204 to be ((12 lines)/(2 lines))×(5 s)=30 s. As such, ERS process 12 may designate email 202 as read if email 202 is open for more than 30 s.

The marked-read characteristic may also be (116) size 220 (i.e., marked-read characteristic 310) of email 202. The user may select the marked-read characteristic to be size 220 by selecting marked-read characteristic checkbox 328. Further, the user may input time/size rate 346 in order to allow ERS process 12 to determine marked-read preview time 204. For example, if the user selects marked-read characteristic checkbox 328, the marked-read characteristic may be size 220. Further, if the user inputs time/size rate 10 s/5 kilobytes (KB), ERS process 12 may determine marked-read preview time 204 to be ((15 KB)/(5 KB))×(10 s)=00 s. As such, ERS process 12 may designate email 202 as read if email 202 is open for more than 30 s.

In another implementation, the marked-read characteristic may also be (118) at least one of size of an image 222 (i.e., marked-read characteristic 312) and dimensions of an image 224 (i.e., marked-read characteristic 314) of email 202. The user may select the marked-read characteristic to be size of an image 222 and/or dimensions of an image 224 by selecting marked-read characteristic checkbox 330 and/or 332, respectively. Further, the user may input time/image size rate 348 and/or time/image dimension rate 350, respectively, in order to allow ERS process 12 to determine marked-read preview time 204. For example, if the user selects marked-read characteristic checkbox 332, the marked-read characteristic may be dimensions of an image 224. Further, if the user inputs time/image dimension rate 1 s/10,000 px^2, ERS process 12 may determine marked-read preview time 204 to be ((160 px×160 px)/10,000 px^2)×(1 s)=2.6 s. As such, ERS process 12 may designate email 202 as read if email 202 is open for more than 2.6 s. It should be noted that in this example, marked-read preview time 204 has been determined as though the only contents of email 202 is image 232. However, ERS process 12 may also determine marked-read preview time 204 to account for more than one of marked-read characteristics 302-318. For example, if number of lines 218 (i.e., marked-read characteristic 308) is also used to determine marked-read preview time 204, marked-read preview time 204 may be determined to be (30 s)+(2.6 s)=32.6 s.

In another embodiment, user-action characteristics may also be used to designate email 202 as read or unread. ERS process 12 may define 120 a user-action characteristic (e.g., user-action characteristic 316, user-action characteristic 318) corresponding to email 202. ERS process 12 may designate 122 email 202 as read based upon, at least in part, the user-action characteristic (e.g., user-action characteristic 316, user-action characteristic 318). The user-action characteristic may be (124) at least one of scrolling to a bottom of email 202 (e.g., user-action characteristic 316), and a mouse action (e.g., user-action characteristic 318). For example, if the user selects user-action characteristic checkbox 334, the user-action characteristic may be scrolling to a bottom of email 202. If the user scrolls to the bottom of email 202, ERS process 12 may designate email 202 as read. Further, if the user selects user-action characteristic checkbox 336, the user-action characteristic may be a mouse action. If the user moves a mouse pointer onto email 202 while open in preview pane 226, and then moves the mouse pointer off of email 202, ERS process 12 may designate email 202 as read.

It should be noted that while ERS process 12 has been described above as using one or more of inputs 338-350 entered by a user, inputs 338-350 may not be required to be entered by the user. In one implementation, ERS process 12 may use default settings for one or more inputs 338-350, and may not require user input for these values. Further, while chart 230 is shown under email 202 as including various values used by ERS process 12 discussed above, chart 230 may or may not be shown with email 202 in email application 200. Chart 230 has been provided for illustrative purposes.

As will be appreciated by one skilled in the art, aspects of the present invention may be embodied as a system, apparatus, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer (i.e., a client electronic device), partly on the user's computer, as a stand-alone software package, partly on the user's computer and partly on a remote computer or entirely on the remote computer or server (i.e., a server computer). In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Further, one or more blocks shown in the block diagrams and/or flowchart illustration may not be performed in some implementations or may not be required in some implementations. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A computer program product residing on a non-transitory computer readable storage medium having a plurality of instructions stored thereon, which, when executed by a processor, cause the processor to perform operations comprising:

defining by selecting on an interface a marked-read characteristic corresponding to an email from marked-read preferences, wherein the marked-read characteristic comprises e-mail content properties;

determining a marked-read preview time based upon, at least in part, the marked-read characteristic;

designating the email as read based upon, at least in part, the marked-read preview time;

defining by selecting on the interface a user action characteristic corresponding to an email, wherein a user action characteristic is an action performed by a user to select a marked-read preference corresponding to the email; and designating the e-mail as read based upon, at least in part, the user-action characteristic.

2. The computer program product of claim 1 wherein designating the email as read is further based upon, at least in part, an amount of time the email is open.

3. The computer program product of claim 1 wherein designating the email as read is further based upon, at least in part, an amount of time the email is open in a preview pane.

4. The computer program product of claim 1 wherein the marked-read characteristic is a length of the email.

5. The computer program product of claim 4 the length of the email accounts for whitespace in the email.

6. The computer program product of claim 1 the marked-read characteristic is at least one of a number of characters in the email, a number of words in the email, and a number of lines in the email.

7. The computer program product of claim 1 wherein the marked-read characteristic is a size of the email.

8. The computer program product of claim 1 wherein the marked-read characteristic is at least one of a size of an image in the email, and dimensions of the image in the email.

9. The computer program product of claim 1 further comprising instructions for:

defining a user-action characteristic corresponding to the email; and designating the email as read based upon, at least in part, the user-action characteristic.

10. The computer program product of claim 9 wherein the user action characteristic is at least one of scrolling to a bottom of the email, and a mouse action.

11. A computing system comprising:

at least one processor;

at least one memory architecture coupled with the at least one processor;

a first software module executed on the at least one processor and the at least one memory architecture, wherein the first software module is configured to define by selecting on an interface a marked-read characteristic corresponding to an email from marked-read preferences, wherein the marked-read characteristic comprises e-mail content properties, and configured to define by selecting on the interface a user action characteristic corresponding to an email, wherein a user action characteristic is an action performed by a user to select the marked-read preference corresponding to the email;

a second software module executed on the at least one processor and the at least one memory architecture, wherein the second software module is configured to determine a marked-read preview time based upon, at least in part, the marked-read characteristic; and a third software module executed on the at least one processor and the at least one memory architecture, wherein the third software module is configured to designate the email as read based upon, at least in part, the marked-read preview time;

wherein the e-mail is designated as read based upon, at least in part, the user-action characteristic.

12. The computing system of claim 11 wherein designating the email as read is further based upon, at least in part, an amount of time the email is open.

13. The computing system of claim 11 wherein designating the email as read is further based upon, at least in part, an amount of time the email is open in a preview pane.

14. The computing system of claim 11 wherein the marked-read characteristic is a length of the email.

15. The computing system of claim 14 wherein the length of the email accounts for whitespace in the email.

16. The computer program product of claim 1, wherein the marked-read characteristic includes one of a length of the e-mail, a number of characters in the e-mail, a number of words in the e-mail, a number of lines in the e-mail, a size of the e-mail, an image size in the e-mail and image dimensions in the e-mail.

17. The computer program product of claim 1, wherein a user action characteristic comprises one of scrolling to a bottom of the e-mail and moving a mouse away from the e-mail.

* * * * *